May 28, 1968  C. R. ZIMMERMAN  3,385,243
SEED DRILL
Filed Oct. 22, 1965  2 Sheets-Sheet 1
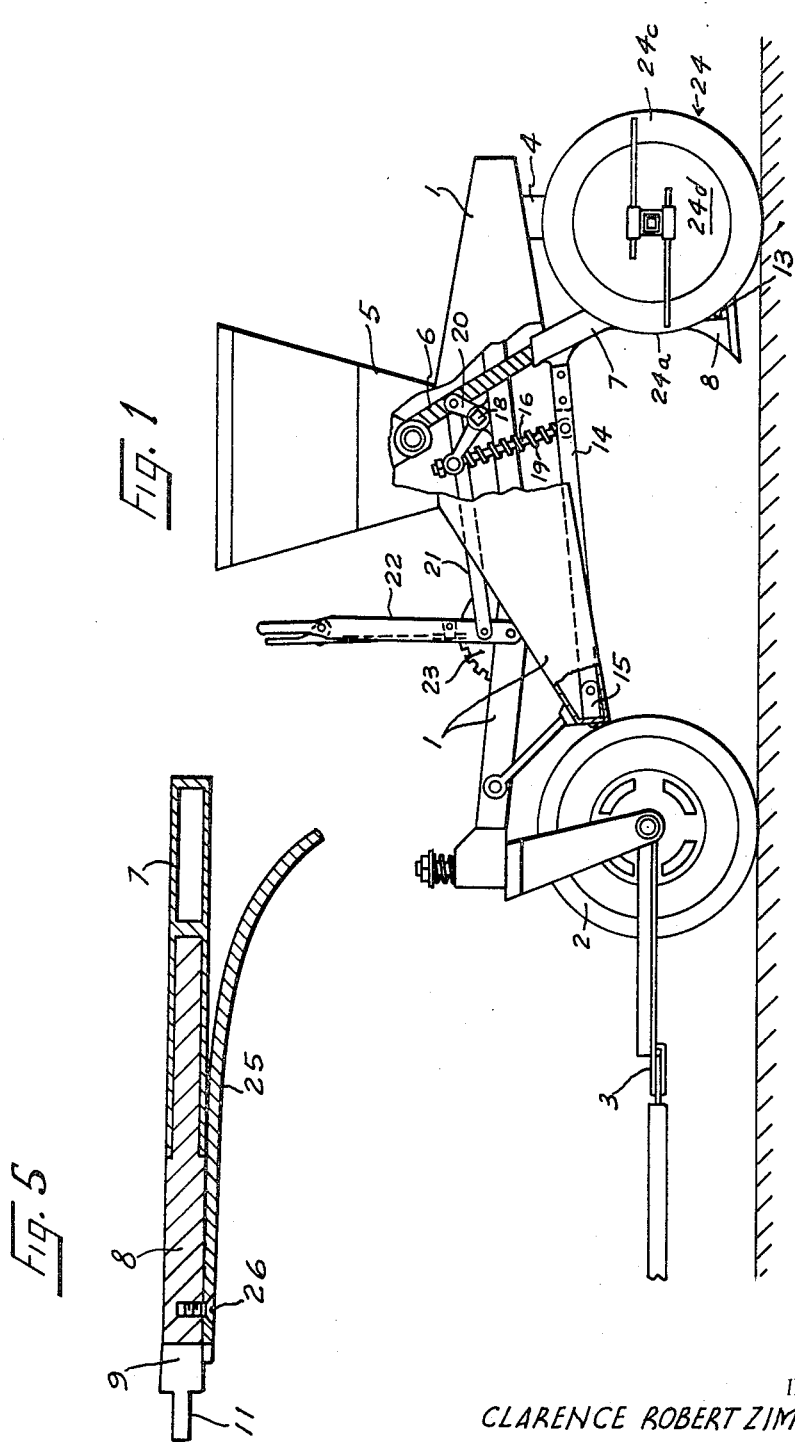
INVENTOR.
CLARENCE ROBERT ZIMMERMAN
BY Weller & H John
ATTYS.

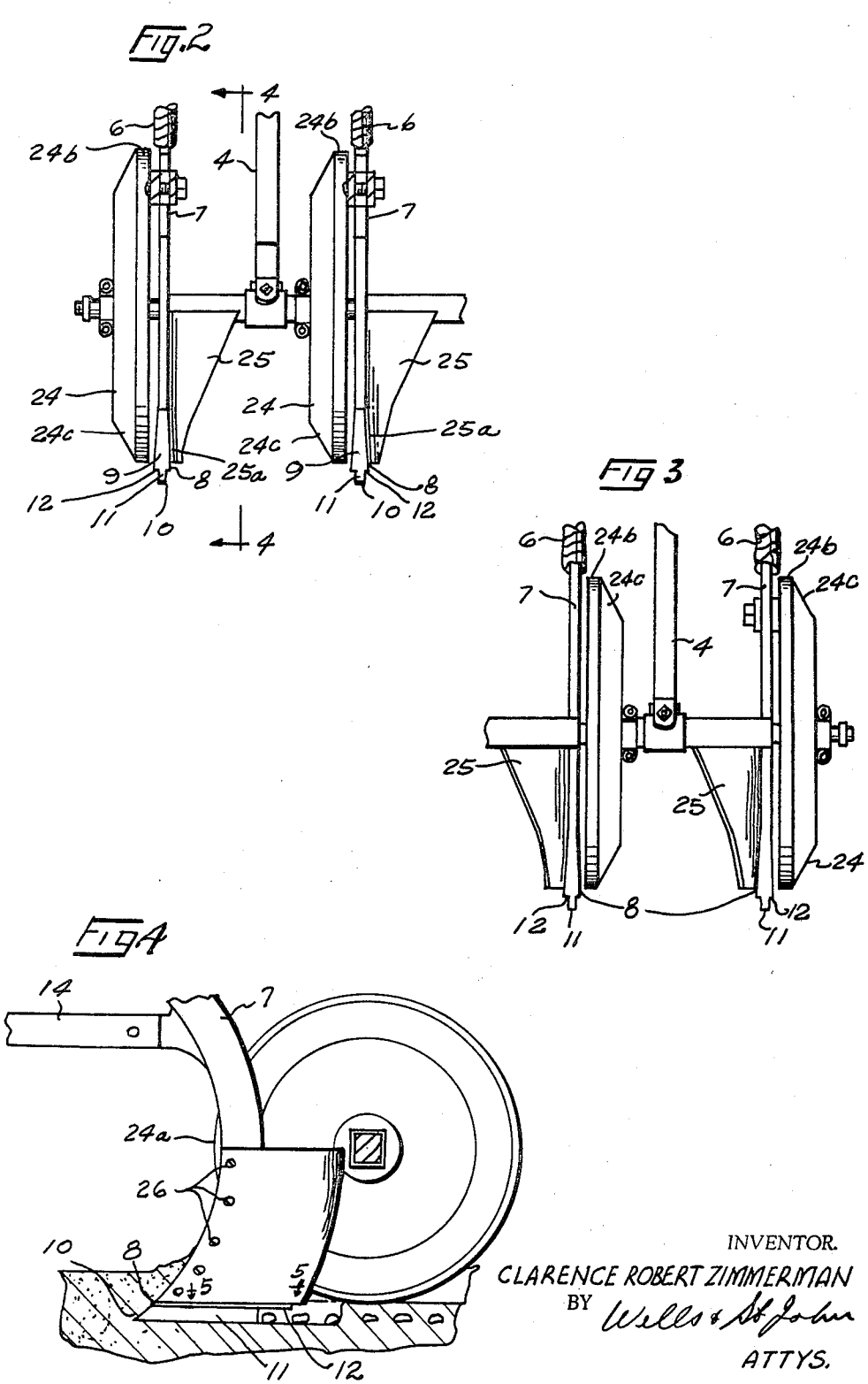

3,385,243
SEED DRILL
Clarence Robert Zimmerman, Box 6,
Almira, Wash. 99103
Filed Oct. 22, 1965, Ser. No. 500,772
3 Claims. (Cl. 111—85)

ABSTRACT OF THE DISCLOSURE

A furrow opener is fixed to the lower portion of the drill seed tube. The opener has a narrow blade extending along its bottom edge to open a seed trench and has a front face inclining downwardly and forwardly from the seed tube. This furrow opener has a shovel wing affixed thereto on one side thereof and diverging from the opener and tube from front to rear. The shovel wing has its lower edge above the narrow blade. There is a packer wheel rotatably mounted alongside the seed tube on the side thereof opposite the shovel wing. The packer wheel pressure acts to force the soil into the trench made by the narrow blade to cover seed therein without packing the soil downwardly over the seed and the shovel wing keeps soil from rolling over the trench from the other side, thus limiting the depth of the soil over the seed.

---

This invention relates to seed drills and in particular to the type of seed drill that utilizes a furrow opening point which provides a trench or furrow of the proper depth. The seed delivering tube is immediately behind the point and delivers the seed into the bottom of the furrow. In my prior Patent No. 3,177,830 a seed drill is shown wherein such a point is combined with shovel wings to lift out or deflect the overburden of soil alongside the furrow opener and with press wheels which keep the soil away from the trench until after the seed is deposited and pack the slopes of the trench or furrow. My prior Patent No. 3,319,590 for Seed Drill shows an improved seed drill which also utilizes the furrow opening point and the press wheels but eliminates the shovel wings, using the press wheels to deflect and pack the soil at the sides of the furrow.

In some soil conditions the necessity of deep furrows to reach the moisture with the seed is not so great and there is room for the deflected soil between furrows. It is the purpose of the present invention to provide a new furrow opener, shovel wing and press wheel combination whereby to obtain accurate depth placement of the seed with the advantage of preventing pile up of trash on the seed delivery tubes and the further advantage of simplifying the structure.

The nature and advantages of my invention will appear more fully from the following description and the accompanying drawings which illustrate a preferred form of the invention.

In the drawings:

FIGURE 1 is a side view of a seed drill to which my invention applies;

FIGURE 2 is a fragmentary view looking at the front of two of the furrow opening and seed depositing units;

FIGURE 3 is a fragmentary view looking at two of the units from the rear;

FIGURE 4 is a sectional view taken on the line 4—4 of FIGURE 2; and

FIGURE 5 is an enlarged sectional view on the line 5—5 of FIGURE 4.

Referring now to the drawings, my invention is shown as applied to a drill which has a frame 1 having a front wheel 2, draw bar 3, and packer wheel pedestals 4. A seed hopper 5 is provided with known seed outlets 6 which deliver seeds into seed tubes 7 that are arranged at suitable spacing intervals and extend down to furrow openers 8. These furrow openers are constructed generally like those in my prior Patent No. 3,319,590 referred to hereinbefore. The furrow opener 8 has a front face 9 that curves forwardly to its lower front tip 10. The furrow opener includes the narrow blade portion 11 which makes a trench or furrow for the seeds. The seed tube 7 is bolted to the opener 8 by bolts 13 and extends down to the ledges 12 which define the upper extent of the blade portion 11.

The seed tube 7 is secured to an arm 14 which has its forward end pivoted to a bracket 15 in the frame 1. The arm 14 is supported by a depth adjusting rod 16 that has its upper end carried by an arm 17 on a rock shaft 18. A spring 19 surrounds each rod 16 between the arms 14 and 17 and each rod 16 is slidable upward through the corresponding arm 17 upon compression of the spring 19. Thus the arms 17 can be used to lift the rods 16 and through them and the seed tubes 7, to raise the furrow openers 8 out of the soil. When the arms 17 are pushed down they will, through the springs 19, yieldingly urge the front tips 10 of the furrow openers 8 into the soil. The shape of the furrow opener 8 is such that it normally tends to penetrate the soil to the full depth permitted by the rod 16. The structure just described does, however, allow the tips 10 to rise by compressing the springs 19 when excessively hard ground, etc. is encountered by a furrow opener 8.

An arm 20 on the rock shaft 18 is connected by a link 21 to a hand lever 22 having the known pawl and lever mechanism for engaging a curved rack 23. With this mechanism the furrow openers 8 can be adjusted up and down in the soil.

My present invention embodies a combination with the furrow opener 8 and seed tube 7 of a packer wheel 24 on one side thereof and a shovel wing 25 on the other side thereof. The packer wheel 24 is so positioned that its most forward point 24a is forward of the adjacent seed tube 7. The shape of the packer wheel is important. It has a flat rim flange 24b, a conical portion 24c and a flat central portion 24d. The flat rim 24b presses the soil down and laterally to fill the trench made by the blade 11. The portion 24c pushes the overburden of soil laterally and the central portion 24d deflects any soil thrown across to it by the wings 25. Thus the packer wheels 24 in rolling will move down at the front of the seed tube 7 and furrow opener 8 to wipe off any trash tending to cling to them. The shovel wing 25 has its front edge portion secured directly to the furrow opener seed tube assembly by any suitable means, such as screws 26. The front edge 25a is flush with the front face 9.

The packer wheel 24 and the shovel wing 25 cooperate to move the soil away from the seed trench, leaving only the desired amount of soil covering the deposited seeds. One wall of the furrow thus formed is packed by the packer wheel, while the other wall is shaped to the desired incline by the shovel wing 25. If the speed of travel is high some soil may be thrown by the shovel wing 25 across to the packer wheel 24 for the next adjacent furrow opener, but this packer wheel protects the corresponding furrow from being filled by the thrown soil.

The shovel wing 25 is curved at its front portion and diverges from the seed tube-furrow opener assembly rearwardly. The top edge of the wing is curved out far beyond the lower edge thereof so as to turn the soil over and direct it toward the side of the next adjacent packer wheel. The shape of the shovel wing 25 may vary considerably. Its lower edge must, of course, be far enough above the adjacent blade portion 11 to assure coverage of the seed deposited in the blade trench to the desired depth. The pressure of the packer wheel 24 on the soil does collapse the trench wall and force soil laterally to press it against the seed, but there is no packing of the soil downwardly from above the seed to form a crust over it.

With this combination of a tube and furrow opener to place seed in a seed receiving trench, a shovel wing located on side of the furrow opener and a packer wheel on the other side of the opener, the seeds can be covered with an adequate amount of soil with most of the furrow left without compaction and with only one packer wheel per furrow. This effects considerable saving in the cost of the seed drill. It also enables the operator to move the opener-seed tube assembly up and down to reach the moisture level in the soil with minimum variation in the depth of soil cover over the seeds.

Having described my invention, I claim:

1. In a seed drill having a main frame and a seed hopper on said frame with a plurality of seed outlets, means connected with the outlets to make a furrow and deposit seeds therein and cover them with soil comprising:
    a seed tube carried by the frame;
    a furrow opener affixed to the tube and having a front face inclining downwardly and forwardly therefrom, said opener having a depending narrow blade to open a seed trench;
    a packer wheel rotatably mounted to the frame on one side only of said furrow opener and seed tube in juxtaposition to and overlapped with the said tube, said wheel having a rim portion and a conical portion tapering away from the plane of the furrow opener toward the axis of the wheel; and
    a shovel wing having its front portion fixed to the furrow opener on the other side only of the furrow opener and seed tube from the wheel, said wing diverging from the opener and tube from its front portion rearwardly and having its lower edge above the narrow blade portion of the furrow opener.

2. The device defined in claim 1 wherein the shovel wing has its front edge aligned with said front face of the furrow opener.

3. The device defined in claim 1 wherein the packer wheel center is offset rearwardly with respect to the shovel wing rear edge to intercept soil thrown from the shovel wing of an adjacent furrow opener.

References Cited

UNITED STATES PATENTS

| 2,569,870 | 10/1951 | Roberts | 172—176 |
| 3,177,830 | 4/1965 | Zimmerman | 111—85 |
| 3,180,291 | 4/1965 | Loomans | 111—85 |

ANTONIO F. GUIDA, *Primary Examiner.*

ABRAHAM G. STONE, *Examiner.*

R. C. HARRINGTON, *Assistant Examiner.*